United States Patent
Perren et al.

(10) Patent No.: US 9,179,704 B2
(45) Date of Patent: Nov. 10, 2015

(54) METHOD FOR ROASTING AND SURFACE-PASTEURIZATION OF FOODS PRODUCTS

(75) Inventors: Rainer Perren, Grosswangen (CH); Jürgen Fischer, Oberderdingen (DE)

(73) Assignee: BUHLER BARTH AG, Freiberg am Neckar (DE)

( * ) Notice: Subject to any disclaimer, the term of this patent is extended or adjusted under 35 U.S.C. 154(b) by 237 days.

(21) Appl. No.: 12/648,023

(22) Filed: Dec. 28, 2009

(65) Prior Publication Data

US 2010/0136192 A1 Jun. 3, 2010

Related U.S. Application Data

(63) Continuation of application No. PCT/EP2008/002906, filed on Apr. 12, 2008.

(30) Foreign Application Priority Data

Jul. 2, 2007 (DE) .......................... 10 2007 030 661
Mar. 19, 2008 (DE) .......................... 10 2008 015 063

(51) Int. Cl.
*A23L 3/16* (2006.01)
*A23N 12/08* (2006.01)
*A23B 9/02* (2006.01)
(Continued)

(52) U.S. Cl.
CPC . *A23N 12/08* (2013.01); *A23B 9/02* (2013.01); *A23L 1/0121* (2013.01); *A23L 1/0128* (2013.01); *A23L 1/364* (2013.01); *A23L 3/16* (2013.01)

(58) Field of Classification Search
USPC .................................... 426/521, 467
See application file for complete search history.

(56) References Cited

U.S. PATENT DOCUMENTS

| 2,558,854 | A |   | 7/1951 | Kempf et al. |
| 4,161,549 | A |   | 7/1979 | Ohno |
| 5,718,936 | A | * | 2/1998 | Porter et al. .................. 426/289 |

(Continued)

FOREIGN PATENT DOCUMENTS

| DE | 1692234 A | 4/1972 |
| DE | 3902679 A1 | 8/1990 |

(Continued)

OTHER PUBLICATIONS

Kozempel et al., "The Vacuum/Steam/Vacuum Process", Food Technology, vol. 57, No. 12, Dec. 2003, pp. 30-33.
Clark, "Thermal Processing of Solids", Food Technology 61, (04), 79-82, 2007.

(Continued)

*Primary Examiner* — Lien T Tran
(74) *Attorney, Agent, or Firm* — Buchanan Ingersoll & Rooney PC

(57) ABSTRACT

The disclosure relates to a process for roasting and surface pasteurization of particulate food products. The roasting and surface pasteurization can be combined and united to form one process wherein a treatment is carried out in a moist atmosphere at temperatures <100° C., that the pasteurization treatment is carried out in a roasting system during the roasting operation, that during the pasteurization phase the temperature of the product surface is held a few degrees below the dew point temperature of the atmosphere which is established, that the pasteurization is performed for 1-30 min, and that with advancing or continued roasting the water of condensation on the surface of the food products is removed and the water uptake of the same is minimized.

18 Claims, 2 Drawing Sheets

(51) Int. Cl.
*A23L 1/01* (2006.01)
*A23L 1/36* (2006.01)

(56) References Cited

U.S. PATENT DOCUMENTS

| | | | |
|---|---|---|---|
| 6,066,351 A * | 5/2000 | Tabata et al. | 426/520 |
| 6,579,559 B2 | 6/2003 | Isogaya | |
| 7,849,788 B2 * | 12/2010 | Macaluso | 99/536 |
| 2003/0198729 A1 | 10/2003 | Fuhrmann et al. | |
| 2006/0040029 A1 | 2/2006 | Gunawardena et al. | |

FOREIGN PATENT DOCUMENTS

| | | |
|---|---|---|
| DE | 699 16 279 T2 | 4/2005 |
| EP | 0 729 705 A2 | 9/1996 |
| FR | 2680637 A1 | 3/1993 |
| NZ | 510718 | 2/2002 |
| WO | 01/43572 A1 | 6/2001 |
| WO | 03/037109 A1 | 5/2003 |

OTHER PUBLICATIONS

Gysel, "Die Entkeimung von pflanzlichen Trockenprodukten mit Sattdampf", Dissertation ETH No. 9203, Oct. 2, 1990.

* cited by examiner

A   Pile temperature Roasting Zone
B   Hot Air Temperature
C   Exhaust Air Temperature
D   Pile Temperature Cooling Zone
E   Approx. Product Surface Temperature
F   Air Volume Flow

METHOD FOR ROASTING AND SURFACE-PASTEURIZATION OF FOODS PRODUCTS

CROSS-REFERENCE TO RELATED APPLICATION

This application claims the benefit of the priority filing date of international application no. PCT/EP2008/002906 and German application nos. 10 2007 030 661.1 filed on Jul. 2, 2007 and 10 2008 015 063.0 filed on Mar. 19, 2008.

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The device relates to a method for roasting and for the surface pasteurization of pieces of food products, in particular oleaginous seeds, such as almonds, hazelnuts, pecans, walnuts, as well as peanuts, bran, cereals, coffee, cocoa and the like. By nature, agricultural products and foods are loaded with harmless and potentially pathogenic micro-organisms. In most cases, agricultural products are processed fresh, or are made durable with the aid of suitable technological means. Among industrially employed preservation methods are, inter alia, sterilization or pasteurization by means of heat, irradiation with ionizing rays, and gassing with lethally-acting gases. The two last-mentioned methods in particular can only be employed in a limited manner, since the use of these methods is strictly regulated by law.

In the past years, several cases of contamination of raw almonds with salmonella have been reported. To improve the safety of almond products, U.S. authorities have ordered that, starting in autumn of 2007, the entire almond harvest is to be pasteurized. Pasteurization of almonds and other oleaginous seeds requires special demands on the methods to be used. The water content of the almonds is not allowed to be increased to an appreciable degree, by and during treatment, because both the storage capability and the integrity of the almonds are harmed. Moreover, in the course of intensive thermal or mechanical treatment, raw almonds tend to lose the skin around the seed, decreasing quality.

Moreover, US authorities have made the requirement that pasteurization may take place within the course of the customary subsequent processing steps, such as, for example, during blanching or roasting. Here, sufficient inactivation must be assured by the sum of these process steps.

Various devices and methods have been described for hot-air roasting of nuts and almonds. A compilation of these methods can be found in Finke (1965), Kleinert (1966), Gaupp (1978), Bockelmann (1987) or Perren (1995). Commonly, in hot-air roasting methods, the nuts are charged with dry, hot air at 125° C. to approximately 600° C. Because of this, the nuts are heated and are roasted within 8 to 60 minutes. Roasting is characterized by the formation of a roasting stage. By roasting, the water content is reduced to less than 2.5%, and the texture is modified to a crunchy-crackly and brittle texture. Furthermore, a roast color is formed in the range between light brown to dark brown, and a typical roasting aroma and pleasant roasted taste are created.

Effective heat inactivation of micro-organisms is customarily obtained in an atmosphere of increased water activity. In contrast thereto, micro-organisms are only inactivated to a limited extent by dry heating. Since roasting by means of hot air constitutes treatment in a dry atmosphere, an assured inactivation of micro-organisms by hot-air roasting only takes place after a very long treatment time, or respectively at high temperatures.

Parameters which are required for achieving inactivation of the described surrogates for Salmonella SE PT 30 at an order of a magnitude of 4 log-units, are described in the "Guidelines for Validation of Dry Roast Processes" of the Almond Board of California. The described product temperature, time, and/or combinations thereof, which must be attained for minimal heat inactivation in the course of hot-air roasting, are so high that at these conditions high roasting stages and correspondingly dark roast colors are exclusively formed. Thus, only in the case of very advanced roasting stages is it possible to achieve an inactivation of micro-organisms in an order of a magnitude of 4 log-units which, in accordance with the stipulation of the American authorities, does not permit a classification of "pasteurized".

In the two-stage roasting process of Perren et al. (1996), the hot air is subjected to moisturizing, which leads to an increase in atmospheric humidity. The described increase in humidity in the first process stage to approximately 10% is not sufficient here for creating an atmosphere which causes the assured inactivation of vegetative micro-organisms.

On the other hand, methods for sterilizing pieces of food, and in particular of almonds, have been described. A compilation of the methods accepted for pasteurizing almonds is provided on the website of the Almond Board of California (www.almondsarein.com).

Many described pasteurization methods deal with isolated treatment of products in humid atmospheres at temperatures in the range of 60 to 100° C. under normal pressure conditions. The exclusive aim of these methods is to reduce the contamination of the surfaces of the almonds by micro-organisms. Because of the short process duration and because of the humid atmosphere, these methods are not capable of forming a roasting stage. Neither is drying of the products to <2.5% achieved, nor are there typical textures, roasting aromas and roast colors with these pasteurization methods.

Thus, no method is described in the prior art capable of pasteurizing nuts, almonds, oleaginous seeds and other goods in piece form, simultaneously or in the same process, in an assured manner, and to roast them in hot air.

It is the object of the invention to create a method of the type described at the outset, wherein hot-air roasting and pasteurization of food products are combined and both methods are united.

In accordance with the invention, this object is attained in that a treatment in a humid atmosphere is performed at a temperature <100° C., that pasteurization is performed in a roasting system during the roasting process, that during the pasteurization phase the temperature on the product surface is maintained a few degrees below the selected dew-point temperature of the atmosphere, that pasteurization is performed within 1 to 30 mins, and that, in the course of advancing or continued roasting, condensation water on the surface of the food products is removed and water absorption of the latter is minimized.

Conditions are created for inactivating vegetative germs under optimal conditions and in a short time. The roasting process is subsequently continued and the products are brought to the desired degree of roasting.

Pasteurization is optimized in that the treatment is performed in a humid atmosphere, preferably at temperatures between 50° C. and 90° C., and during the pasteurization phase the temperature on the product surface is preferably selected to lie 0° C. to 8° C. below the dew-point temperature selected for the atmosphere.

SUMMARY

The invention relates to a process for roasting and surface pasteurization of particulate food products. The roasting and surface pasteurization can be combined and united to form one process, if, according to the invention, it is provided that treatment is carried out in a moist atmosphere at temperatures <00° C., that pasteurization treatment is carried out in a roasting system during the roasting operation, that during the pasteurization phase, the temperature of the product surface is held a few degrees below the dew point temperature of the atmosphere which is established, that the pasteurization is performed for 1-30 min, and that with advancing or continued roasting, the water of condensation on the surface of the food products is removed and the water uptake of the same is minimized.

DESCRIPTION

Figure 1:
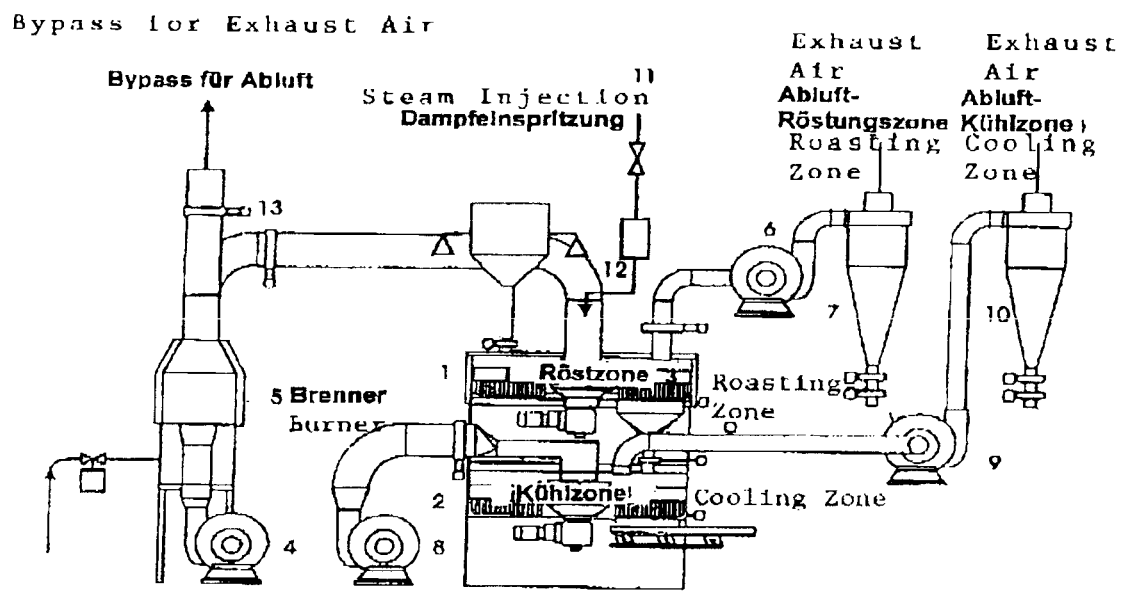
FIG. 1, a hot-air roasting installation NR, equipped with a steam injection device for surface pasteurization during roasting of the material to be roasted.

The method described is, for example, performed in a hot-air roasting system NR as represented in FIG. 1. A product charge is prepared in a preparation container and introduced into a roasting zone 1. Then air is aspirated by means of a ventilator 4, is heated by means of gas in a burner 5 and is centrally brought to the roasting zone 1. The hot roasting air is introduced into the material to be roasted via a rotating tuyère connection 3. As soon as the surface temperature of the material to be roasted has reached a preset pasteurization temperature in the range between 50 and 99° C., the pasteurization phase is started.

During the pasteurization phase, the volume of the air flow through the roasting zone 1 is reduced to 0-20 Nm3/h/kg of the product by a flap system 13, and steam injection into the hot air is started via a valve 11 and a screen 12 at an order of magnitude of 0.01-15.0 kg steam/h/kg of the food product. The amounts of air and steam are of such a size that the dew-point temperature of the hot air mixed with steam lies approximately 0 to 8° C. above the surface temperature of the material to be roasted. Because of this temperature difference, water condenses on the product surface until the surface temperature equalizes the dew-point temperature of the moistened hot air. Because of the water condensation, a water layer forms on the surface, in which optimal conditions for inactivation of vegetative micro-organisms exist. These optimal pasteurization conditions are then maintained for 1 to 30 mins, along with a constant flow of moist air and at a constant hot air temperature, until the desired or intended pasteurization effect has occurred. It must be noted that because of the increase in product temperature by 8° C., for example, an increase of the water content of the food product by max. 0.8% results because of the condensation of water vapor on the surface based on an approximate absorption of 0.1% water per ° C.

Figure 2:
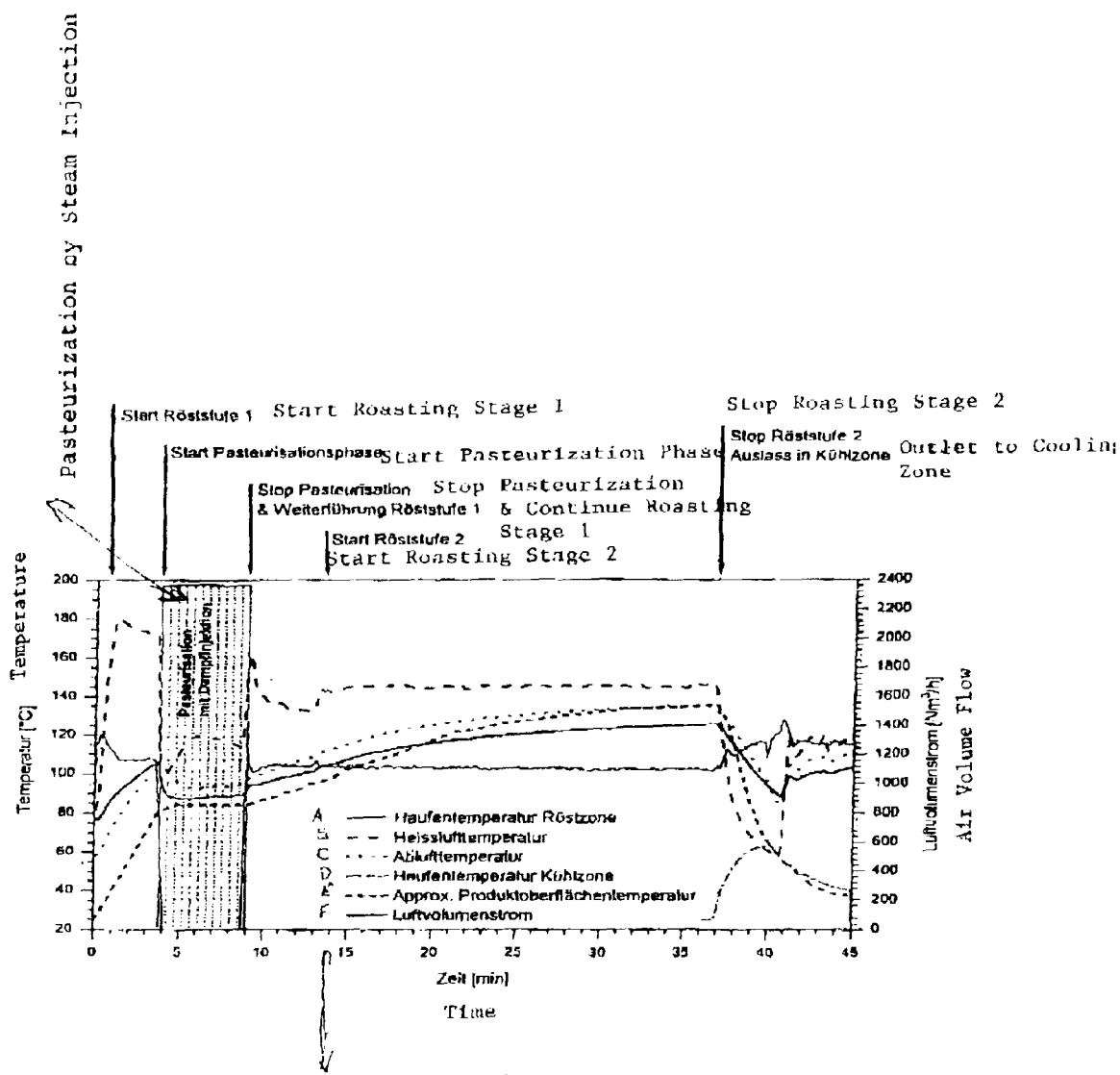
FIG. 2, is an example of the time progression of the two-stage roasting process, interrupted by a pasteurization phase at a pile temperature of 105° C.

Following the pasteurization phases, the two-stage roasting process, as described in Perren et al. (1996) and in Perren and Escher (1997), is continued. To this end, the introduction of steam is interrupted and the hot air volume flow is increased again to a predetermined degree. In the course of continuation of the roasting process, the food products are still dried during the first stage of the roasting process (consisting of two roasting phases). In the second roasting stage, the desired degree of roasting is then provided at a predetermined hot air temperature. An example of the progression of a two-stage roasting process, combined with a pasteurization phase, is represented in FIG. 2.

In order to minimize undesired qualitative changes in the food products, it is necessary to reduce the absorption of water during the pasteurization phase as much as possible. This can be achieved if the product surface temperature is in agreement with the dew-point temperature intended, on the basis of the selected air and steam volume flow. From this, results the active phase of the pasteurization phase required for the inactivation of micro-organisms. Examples of the pasteurization effect of the pure pasteurization phase in connection with almonds as a function of the length of treatment and starting temperature of the pasteurization phase are recited in Table 1.

By means of the represented integration of a pasteurization phase into the hot air roasting method, it becomes possible to pasteurize the food products and to roast them by means of hot air in only one method step. Moreover, the achieved pasteurization effect is independent of the degree of roasting to be achieved. In this way, it is easily possible to pasteurize almonds and other food products dependably and reproducibly in the course of hot air roasting, without it being necessary to reach a dark roast color or a high degree of roasting.

The pasteurization method described here is also suitable for a combined pasteurization and roasting treatment of other oleaginous seeds, such as hazelnuts, pecans, and walnuts, as well as peanuts, bran, cereals, coffee, cocoa and the like.

In the course of a roasting process in hot air, the heat inactivation method introduced here is suitable for decisively reducing the microbial surface contamination of almonds, oleaginous seeds, as well as other piece-sized food products of medium or low water content, without altering the qualitative properties of the roasted food products. Thus, in accordance with the stipulation of US authorities, it is therefore possible to speak of pasteurization, since, by means of the method, a reduction in the micro-flora, in particular salmonella SE TP 30, of 5 log-units, is dependably achieved.

TABLE 1

Method parameters for surface pasteurization of raw almonds inoculated with *Enterococcus faecium* NRRL-B2354 NR-roasting installation in the course of roasting in a device with a two-stage roasting process. Roasting was terminated after the pasteurization stage and the two phases of the first roasting stage (phase 1: 170° C. air temperature during 4 min; phase 2: 133° C. air temperature during 4 min) for detecting the effect of the pasteurization stage. The initial contamination with *E. faecium* (reference organism) was $2*10^7$ CFU/g.

| Pile tempera-ture for the start of pastereu-zat. phas.[1] °C. | Conditions during the Pasteurization Phase ||||| 
|---|---|---|---|---|---|
| | Hot air temp. °C. | Hot air volume flow Nm3/h/kg material | Steam output kg/h/kg material | Length of time min | Pressure mbar |
| 105 | 90 | 2 | 12 | 2 | −10 |
| 105 | 91 | 2 | 12 | 5 | −10 |
| 105 | 90 | 2 | 12 | 10 | −10 |
| 110 | 94 | 2 | 12 | 5 | −10 |
| 100 | 88 | 2 | 12 | 5 | −10 |
| 105 | 92 | 2 | 12 | 5 | −10 |

| Mean content of *E. faecium* after pasteurization treatment |||
|---|---|---|
| CFU/g | σ | log-reduction |
| 0.45 ± | 0.89 | 7.7 |
| 0.3 ± | 0.80 | 7.8 |
| 0.15 ± | 0.37 | 8.1 |
| 0.05 ± | 0.22 | 8.6 |
| 2.5 ± | 4.24 | 6.9 |
| 1.45 ± | 2.03 | 7.2 |

[1]The pile temperature of the roasting installation NR represents a mixing temperature, which is the result of the temperature on the nut surface, and the hot air temperature, as well as further influencing factors.

BIBLIOGRAPHY

Almond Board of California, 2007, "Guidelines for Validation of Dry Roast Processes", Modesto, Calif.

H. Bockelmann, 1987, "Derzeitiger Entwicklungsstand der Herstellungstechnologie von gerösteten und gesalzenen Nüssen" [Present State of the Development of the Production Technology for Roasted and Salted Nuts], Süsswaren 31 (½), 39-44

A. Finke, 1965, "Handbuch der Kakaoerzeugnisse" [Manual of Cocoa Products], Springer, publishers, Berlin E. Gaupp, 1978, "Vom hellsten bis zum dunkelsten Braun" [From the Lightest to the Darkest Brown Color], Süsswaren 22 (8, 22-29

J. Kleinert, 1966, "Einige Aspekte der Kakaobohnenröstung" [Some Aspects of Cocoa Bean Roasting], Gordian 66, 3 17

R. Perren, 1995, "Untersuchungen über das Rüsten von Haselnüssen" [Research Regarding the Roasting of Hazelnuts], Dissertation ETH No. 11390, Swiss Technical University ETH, Zürich R. Perren-Egli, T. Kerne, D. Sandmeier, K. Mayer-Potschak, 1996, "Verfahren zum Rösten von Ölsamen und Vorrichtung zum, Durchführen dieses Verfahrens" [Method for Roasting Oleaginous Seeds and Device for Executing this Method], European Patent Application EP 0 729 705 A2

R. Perren, F. Escher, 1997, "Investigation on the Hot Air Roasting of Nuts", The Manufacturing Confectioner 77 (6), 123-127.

What is claimed:

1. A method for roasting and for surface pasteurization of food product pieces, comprising:
   providing a roasting system;
   performing a pasteurization treatment during a pasteurization phase in the roasting system during a roasting process, wherein the volume of the air flow through the roasting zone is reduced to 0-20 $Nm^3$/h/kg of the product, and steam injection into the hot air is started via a valve and a screen at an order of magnitude of 0.01-15.0 kg steam/h/kg of the food product;
   performing the pasteurization treatment of the food product pieces in a humid atmosphere at a temperature <100° C.;
   maintaining a temperature on the surface of the food product pieces during at least a part of the pasteurization phase below a selected dew-point temperature of the humid atmosphere;
   performing the pasteurization treatment within 1 to 30 mins; and
   removing condensation water on the surface of the food product pieces in the course of advancing or continued roasting, and thereby minimizing the water absorption of the food product pieces, wherein following the pasteurization phase the introduction of steam is interrupted.

2. The method in accordance with claim 1, wherein the pasteurization treatment is performed at temperatures between 50° C. and 99° C.

3. The method in accordance with claim 1, wherein in the pasteurization phase, the temperature of the product surface is selected to lie between 0° C. to 8° C. below the selected dew-point temperature of the humid atmosphere.

4. The method in accordance with claim 1, comprising:
   preparing a product charge comprising the food product pieces in a preparation container;
   introducing the product charge into a roasting zone of the roasting system, wherein the roasting system comprises a ventilator;
   aspirating air by the ventilator for generating an air flow;
   heating the air flow in a burner by gas for generating a hot air flow;
   bringing the hot air flow to a central area of the roasting zone; and
   initiating the pasteurization phase as soon as the surface temperature of the product charge to be roasted has reached the pasteurization temperature.

5. The method in accordance with claim 2, comprising:
   preparing a product charge comprising the food product pieces in a preparation container;
   introducing the product charge into a roasting zone of the roasting system, wherein the roasting system comprises a ventilator;
   aspirating air by the ventilator for generating an air flow;
   heating the air flow in a burner by gas for generating a hot air flow;
   bringing the hot air flow to a central area of the roasting zone; and
   initiating the pasteurization phase as soon as the surface temperature of the product charge to be roasted has reached the pasteurization temperature.

6. The method in accordance with claim 3, comprising:
   preparing a product charge comprising the food product pieces in a preparation container;
   introducing the product charge into a roasting zone of the roasting system, wherein the roasting system comprises a ventilator;
   aspirating air by the ventilator for generating an air flow;

heating the air flow in a burner by gas for generating a hot air flow;
bringing the hot air flow to a central area of the roasting zone; and
initiating the pasteurization phase as soon as the surface temperature of the product charge to be roasted has reached the pasteurization temperature.

7. The method in accordance with claim 4, comprising:
providing a flap system comprised in the roasting system;
reducing the hot air flow through the roasting zone during the pasteurization phase with the flap system;
starting steam injection into the hot air flow via a valve and a screen; and
sizing the amounts of hot air flow and steam such that the selected dew-point temperature of the hot air flow mixed with steam lies approximately 0 to 8° C. above the surface temperature of the product charge to be roasted.

8. The method in accordance with claim 5, comprising:
providing a flap system comprised in the roasting system;
reducing the hot air flow through the roasting zone during the pasteurization phase with the flap system;
starting steam injection into the hot air flow via a valve and a screen; and
sizing the amounts of hot air flow and steam such that the selected dew-point temperature of the hot air flow mixed with steam lies approximately 0 to 8° C. above the surface temperature of the product charge to be roasted.

9. The method in accordance with claim 6, comprising:
providing a flap system comprised in the roasting system;
reducing the hot air flow through the roasting zone during the pasteurization phase with the flap system;
starting steam injection into the hot air flow via a valve and a screen; and
sizing the amounts of hot air flow and steam such that the selected dew-point temperature of the hot air flow mixed with steam lies approximately 0 to 8° C. above the surface temperature of the product charge to be roasted.

10. The method in accordance with claim 4, wherein in the course of the pasteurization phase, the product surface temperature is brought to substantially the same temperature as the dew-point temperature on the basis of a selected hot air flow and steam volume flow.

11. The method in accordance with claim 5, wherein in the course of the pasteurization phase, the product surface temperature is brought to substantially the same temperature as the dew-point temperature on the basis of a selected hot air flow and steam volume flow.

12. The method in accordance with claim 6, wherein in the course of the pasteurization phase, the product surface temperature is brought to substantially the same temperature as the dew-point temperature on the basis of a selected hot air flow and steam volume flow.

13. The method in accordance with claim 7, wherein in the course of the pasteurization phase, the product surface temperature is brought to substantially the same temperature as the dew-point temperature on the basis of a selected hot air flow and steam volume flow.

14. The method in accordance with claim 8, wherein in the course of the pasteurization phase, the product surface temperature is brought to substantially the same temperature as the dew-point temperature on the basis of a selected hot air flow and steam volume flow.

15. The method in accordance with claim 9, wherein in the course of the pasteurization phase, the product surface temperature is brought to substantially the same temperature as the dew-point temperature on the basis of a selected hot air flow and steam volume flow.

16. The method in accordance with claim 1, wherein the food product pieces are oleaginous seeds.

17. The method in accordance with claim 16, wherein the food product pieces are chosen from almonds, hazelnuts, pecans, walnuts.

18. The method in accordance with claim 1, wherein the food product pieces are chosen from peanuts, bran, cereals, coffee or coca.

* * * * *